United States Patent
Park

(10) Patent No.: US 7,680,649 B2
(45) Date of Patent: Mar. 16, 2010

(54) SYSTEM, METHOD, PROGRAM PRODUCT, AND NETWORKING USE FOR RECOGNIZING WORDS AND THEIR PARTS OF SPEECH IN ONE OR MORE NATURAL LANGUAGES

(75) Inventor: Youngja Park, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 10/173,931

(22) Filed: Jun. 17, 2002

(65) Prior Publication Data

US 2003/0233235 A1   Dec. 18, 2003

(51) Int. Cl.
  *G06F 17/21* (2006.01)
  *G06F 17/20* (2006.01)
(52) U.S. Cl. .......................... 704/10; 704/1
(58) Field of Classification Search .............. 704/1, 704/8, 9, 10, 257
See application file for complete search history.

(56) References Cited

U.S. PATENT DOCUMENTS

| | | | | |
|---|---|---|---|---|
| 4,799,271 A | * | 1/1989 | Nagasawa et al. | 382/231 |
| 4,868,750 A | * | 9/1989 | Kucera et al. | 704/8 |
| 5,029,223 A | * | 7/1991 | Fujisaki | 382/187 |
| 5,079,701 A | * | 1/1992 | Kuga et al. | 704/10 |
| 5,189,610 A | * | 2/1993 | Kaplan et al. | 704/10 |
| 5,392,212 A | * | 2/1995 | Geist | 715/532 |
| 5,479,536 A | * | 12/1995 | Comerford | 382/230 |
| 5,497,319 A | * | 3/1996 | Chong et al. | 704/2 |
| 5,761,689 A | * | 6/1998 | Rayson et al. | 715/533 |
| 5,797,122 A | * | 8/1998 | Spies | 704/255 |
| 5,799,269 A | * | 8/1998 | Schabes et al. | 704/9 |
| 5,806,021 A | * | 9/1998 | Chen et al. | 704/9 |
| 5,835,888 A | * | 11/1998 | Kanevsky et al. | 704/9 |
| 5,867,812 A | * | 2/1999 | Sassano | 704/10 |
| 5,937,422 A | * | 8/1999 | Nelson et al. | 715/531 |
| 6,167,369 A | * | 12/2000 | Schulze | 704/9 |
| 6,169,999 B1 | * | 1/2001 | Kanno | 715/532 |

(Continued)

OTHER PUBLICATIONS

Brown, Peter F., Della Pietra, Vincent J., deSouza, Peter V., Lai, Jenifer C., Mercer, Robert L., "Class-based n-gram models of natural language", Dec. 17, 1990.*

(Continued)

*Primary Examiner*—Richemond Dorvil
*Assistant Examiner*—Eric Yen
(74) *Attorney, Agent, or Firm*—Preston J Young; Hoffman Warnick LLC

(57) ABSTRACT

A system, method, and computer program are disclosed for recognizing one or more words not listed in a dictionary database. One or more sequences of characters in the word are checked to determine a probability that the word is valid. A prefix removal process removes any prefixes from a word, and obtains information about the removed prefix. A suffix removal process removes any suffixes from the word, and obtains information about the removed suffix. A root process obtains information about a root word from the dictionary database. A combination process then determines if the prefix, the root, and the suffix can be combined into a valid word as defined by one or more combination rules, obtains one or more of the possible parts of speech of the valid word, and stores the parts of speech with the valid word in the dictionary database.

21 Claims, 9 Drawing Sheets

U.S. PATENT DOCUMENTS

| | | | |
|---|---|---|---|
| 6,192,333 B1 * | 2/2001 | Pentheroudakis | 704/10 |
| 6,349,282 B1 * | 2/2002 | Van Aelten et al. | 704/257 |
| 6,393,399 B1 * | 5/2002 | Even | 704/257 |
| 6,401,060 B1 * | 6/2002 | Critchlow et al. | 704/1 |
| 6,754,617 B1 * | 6/2004 | Ejerhed | 704/9 |
| 6,801,893 B1 * | 10/2004 | Backfried et al. | 704/257 |
| 7,136,805 B2 * | 11/2006 | Wang | 704/9 |
| 2001/0009009 A1 * | 7/2001 | Iizuka | 707/539 |
| 2003/0120481 A1 * | 6/2003 | Murata et al. | 704/9 |

OTHER PUBLICATIONS

Jian-Yun Nie, Marie-Louise Hannan, Wanying Jin, "Unknown Word Detection and Segmentation of Chinese using Statistical and Heuristic Knowledge", 1995, Communications of the Chinese and Oriental Languages Information Processing Society.*

Hsin-Hsi Chen, Yung-Wei Ding, Shih-Chung Tsai, "Named Entity Extraction for Information Retrieval", Computer Processing of Oriental Languages, vol. 11, No. 4, 1998.*

Adnan El-Nasan, Sriharsha Veeramachaneni, George Nagy, "Word Discrimination BAsed on Bigram Co-occurrences", IEEE, 2001.*

Sheryl R. Young, "Learning New Words from Spontaneous Speech: A Project Summary", Carnegie Mellon, Jul. 29, 1993.*

Masaki Nagata, "Automatic Extraction of New Words from Japanese Texts using Generalized Forward-Backward Search", Proceedings of the Conference on Empirical Methods in Natural Language Processing, 1996.*

Keh-Jiann Chen, Wei-Yun Ma, "Unknown Word Extraction for Chinese Documents", Proceedings of the 19th international conference on Computational linguistics, 2002.*

Endong Xun, Ming Zhou, Changning Huang, "A Unified Statistical Model for Identification of English BaseNP", The Prooceedings of the 38th ACL, 2000.*

Pablo Fetter, "Detection and Transcription of OOV Words", Daimler-Benz AG, Aug. 1998.*

Tung-Hui Chiang, Jing-Shin Chang, Ming-Yu Lin, Keh-Yih Su "Statistical Models for Word Segmentation and Unknown Word Resolution", Proceedings of ROCLING V, 1992.*

Sheryl R. Young, Wayne Ward, "Learning New Words from Spontaneous Speech", IEEE 1993.*

Grace Chung, "Automatically Incorporating Unknown Words in Jupiter", MIT, 2000.*

Helen M. Meng, Wai-Kit Lo, Berlin Chen, Karen Tang, "Generating Phonetic Cognates to Handle Named Entities in English-Chinese Cross-Language Spoken Document Retrieval", IEEE 2001.*

Transformation-Based Error-Driven Learning and Natural Language Processing: A Case Study in Part-of-Search Tagging, pp. 1-23, by Eric Brill, The John Hopkins University.

Automatic Stochastic Tagging of Natural Language Texts, pp. 1-27, by Evangelos Dermatas, University of Patras and George Kokkinakis, University of Patras.

Coping with Ambiguity and Unknown Words through Probabilistic Models, pp. 1-23, by Ralph Weischedel, BBN Systems and Technologies, Richard Schwartz, BBN Systems and Technologies, Jeff Palmucci, BBN Systems and Technologies, Marie Meteer, REnsselaer Polytechnic Institute and Lance Ramshaw, Bowdoin College.

Automatic Spelling Correction Using A Trigram Similarity Measure, pp. 255-261, by Richard C. Angell, George E. Freund and Peter Willett, Department of Studies, University of Sheffield, Sheffield S10 2TN, England.

* cited by examiner

| Method | Sample New Words | |
|---|---|---|
| Prefix | antiasthmatic | JJ |
| | antihypertensive | JJ |
| | antirattle | NN VB |
| | autoinjector | NN |
| | postoperative | JJ NN |
| | remanufacture | NN VB |
| | remanufactured | VBD |
| | streoselectivity | NN |
| Suffix | browsable | JJ |
| | manufacturability | NN |
| | migranious | JJ |
| | oxidizability | NN |
| | towability | NN |
| Prefix+Suffix | rebrowsable | JJ |
| | remanufacturability | NN |
| Compound | airbag | NN |
| | airbreathing | NN VBG |
| | benchmarking | NN VBG |
| | drivetrain | NN |
| | eyedrops | NNS |
| | photopobia | NN |
| | website | NN |
| Entropy Statistics | accelerometers | NNS |
| | anthropometry | NN |
| | cardiovascular | JJ NN |
| | diastolic | JJ NN |
| | electrocardiography | NN |
| | erectile | JJ |
| | hypothyroidism | NN |
| | ingressed | VBD |
| | intravenous | JJ |
| | kinesiology | NN |
| | prophylaxis | NN |
| | pharmacokinetics | NN |
| | sumatriptan | NN |
| | ventilatory | JJ |

JJ – Adjective, NN – noun, NNS – plural form of nouns
VB – verb, VBD – past tense of verbs, VBG – gerund or present participle of verbs

Fig. 9

SYSTEM, METHOD, PROGRAM PRODUCT, AND NETWORKING USE FOR RECOGNIZING WORDS AND THEIR PARTS OF SPEECH IN ONE OR MORE NATURAL LANGUAGES

FIELD OF THE INVENTION

This invention relates to the field of text process in computers. More specifically, the invention relates to probable real words and their parts of speech recognition in natural languages.

BACKGROUND OF THE INVENTION

No current lexicon could be expected to contain entries for every possible word of a language, given the dynamic nature of language and the creativity of human beings. Nowadays, this phenomenon has become even more challenging as new technologies develop faster than before. Updating lexicons (dictionaries) by hand whenever new words are found is almost impossible and, if possible, requires a lot of experts' time and effort.

Thus, inevitably, there always exist out-of-vocabulary (words which are not found in a dictionary) in documents. Especially, many domain-specific technical words as well as newly derived words, such as new compound words and morphological variations of existing words (by means of affixation), can be missing from a given lexicon. Some examples of real words that do not exist in most dictionaries are autoinjector, electrocardiography, eyedrop, remanufacturability, and website.

Words unknown to the lexicon cause a lot of problems especially to natural language processing (NLP) systems such as machine translation systems and parsers, because the lexicon is the most important and basic knowledge source for these applications. When a NLP application sees a word unknown to its lexicon, it either fails to process the document, or guesses information necessary to process the document. However, the guessing is usually not very correct, and thus the system produces a poor result.

There has been a great effort to address this problem, especially in the areas of POS (part-of-speech) taggers and speech recognition. However, different applications recognize the problem of out-of-vocabulary (OOV) in different perspectives and have different goals.

For POS taggers and parsers, which rely on lexical (syntactic) information about words, the goal is to guess the most plausible parts-of-speech of OOV in contexts based on the probability of an unknown word to co-occur its neighboring words. Dermatas and Kokkinakis estimated the probability that an unknown word has a particular POS tag from the probability distribution of words which occur only once in the previously seen texts. See "Automatic stochastic tagging of natural language texts" in *Computational Linguistics*, 21(2), pp 137-164, 1995.

More advanced POS guessing methods use leading and trailing word segments to determine possible tags for unknown words. Weischedel et al. proposed a POS guessing method for unknown words by using the probability for an unknown word to be of a particular POS tag, given its capitalization feature and its ending. See Ralph Weischedel, Marie Meeter, Richard Schwartz, Lance Ramshaw, and Jeff Palmucci. "Coping with ambiguity and unknown words through probabilistic models" in *Computational Linguistics*, 19(2), pp 359-382, 1993.

Eric Brill describes a system of rules which uses both end-guessing and more morphologically motivated rules in "Transformation-Based Error-Driven Learning and Natural Language Processing: A Case Study in Part of Speech Tagging" in *Computational Linguistics*, 21(4), pp 543-565, 1995.

For speech recognition systems, an OOV word is either a word unknown to the system vocabulary or a word that the recognizer fails to recognize. The goal is to find the closest word (in terms of sound and meaning) to the OOV word from the system's vocabulary.

Character ngram-based statistical approaches have been used in word-level language processing such as spell correction and word segmentation. Angell, Freund and Willett describe a method of comparing misspellings with dictionary terms based on the number of trigrams that the two strings have in common, using Dice's similarity coefficient as the measure of similarity. The misspelled word is replaced by the word in the dictionary which best matches the misspelling. See "Automatic Spelling Correction Using a Trigram Similarity Measure" in *Information Processing and Management*, 19(4), pp 255-261, 1983.

Problems with the Prior Art

Previous prior art approaches have at least two problems.

First, the prior art does not permit the recognition and/or identification of valid words in any given natural language. For example, all forms of a word (morphologically changed and/or derived) may not be in a particular dictionary. Further, new words and/or "coined" words won't be in the dictionary database. This problem is particularly evident in technical subjects where new words are used to describe new technologies or advances in old technologies.

Previous approaches begin the process based on the assumption that the OOV words are just unknown to the systems' lexicons, but they are possible real words of the language. That is, these systems treat a new word website and invalid word strings such as adkfiedjfd or v3.5a in the same way. None of the previous works has tried to recognize possible new words of a language and provide a way to augment an existing dictionary, so that these words can be identified properly (as non-OOV) in the future.

Second, previous approaches have been embedded in application systems to protect the system from failing when they meet OOV words or to improve the performance of the system. There is no stand-alone automatic system to find possible real words of a language and to acquire lexical information of the words.

Even though previous approaches aim at OOV problem, they were designed for specific applications. They guess the information of those words, needed for the specific applications, on the basis of the context in which these words appear. Thus, the information of a word may differ according to the contexts.

OBJECTS OF THE INVENTION

An object of this invention is a system and method for recognizing possible real words and/or their parts of speech in a natural language text, which don't exist in a dictionary.

Another object of this invention is a system and method for automatically or semi-automatically identifying new words from text, which may be added in an existing dictionary.

SUMMARY OF THE INVENTION

The present invention is a system, method, program product, and network use for recognizing one or more words not listed in a dictionary data base. A statistical process checks one or more sequences of a subset of two or more characters in the word to determine a probability that the word is a valid word. In preferred embodiments, rules are applied to determine the part of speech of the word.

In alternative embodiments, the invention includes a prefix removal process, a suffix removal process, a root process, and/or a combination process. The prefix removal process removes one or more prefixes from a word where the prefixes are preferably in a prefix list. The prefix removal preferably is constrained by one or more prefix removal rules. The prefix removal process also obtains prefix information about the removed prefix (e.g., from a dictionary data base or prefix list). The suffix removal process removes one or more suffixes from the word where the suffixes are preferably in a suffix list. Preferably, the suffix removal is constrained by one or more suffix removal rules. The suffix removal process also obtains suffix information about the removed suffix (e.g., from the dictionary data base or suffix list). The root process obtains root information about a root word from the dictionary database. (The root word is the word with the prefix and suffix removed.) The combination process then determines if the prefix, the root, and the suffix can be combined into a valid word as defined by one or more combination rules. The combination process then obtains one or more of the possible parts of speech of the valid word, if there is a valid word, and stores the parts of speech with the valid word in the dictionary database (or other memory location).

BRIEF DESCRIPTION OF THE FIGURES

The foregoing and other objects, aspects, and advantages will be better understood from the following non limiting detailed description of preferred embodiments of the invention with reference to the drawings that include the following:

FIG. 9 is an example output of words identified by the present invention as words in a natural language.

DETAILED DESCRIPTION OF THE INVENTION

This invention is a system, method and program to recognize possible real words among out-of-vocabulary words in text, and, in alternative embodiments, to find the parts-of-speech of the identified words, and to augment an existing dictionary. Unlike typical out-of-vocabulary handling systems, this invention proposes, as one preferred embodiment, an entropy model on the basis of the probabilities of trigram sequences in a word.

The words recognized as real words may be added to an existing dictionary of a computer system, so that the computer application can recognize the out-of-vocabulary words and process these words properly in the future. This invention can be integrated into many language processing systems such as a terminology extraction system, a machine translation system and a speech recognition system. In addition, these words can be used for lexicographers to update and/or augment published dictionaries. This invention will provide lexicographers with a good list of new words and will reduce their work. This invention can also be applied to not only English but also other languages including, but not limited to, French, German and Spanish.

Figure 1:
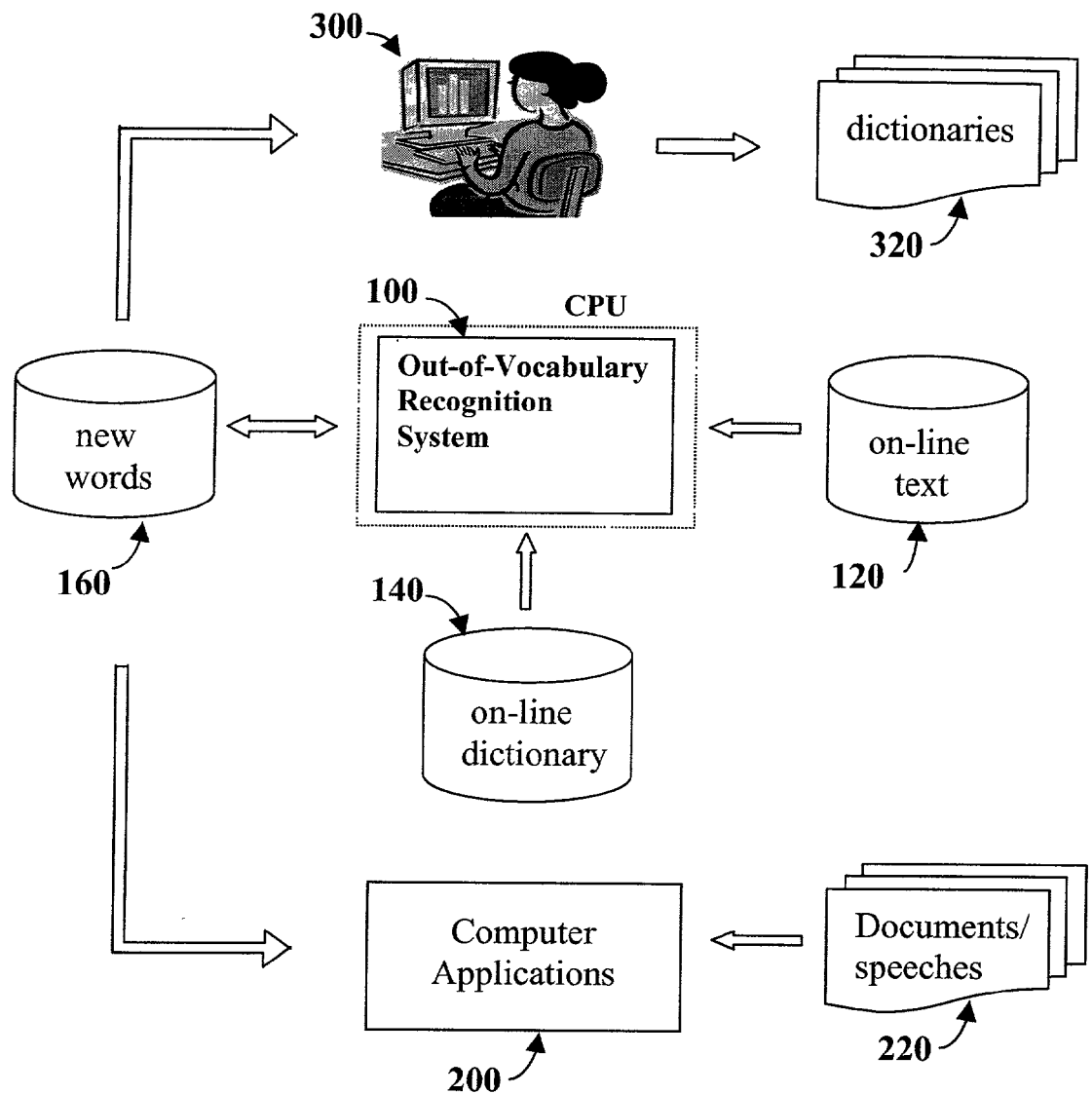
FIG. 1 is a block diagram showing one preferred embodiment of a system using the present invention.

FIG. 1 shows the overall process performed by the present invention. This invention, a dictionary augmentation system (100), is run by any known computer system. It reads in a document (120) from a hard disk or from a network (e.g., the web, intranet, corporate network, etc.), and, for each word in the document, it looks up the word in the on-line dictionary (140) the system uses. (On-line dictionaries are well known and include any memory storage device that stores words in a retrievable manner.) If the word does not exist in the dictionary, this invention examines the word if the word is a possible real word of the target language. Here the target language not only includes generally known natural languages but also technical variations of those languages, e.g., a computer programming/repair manual or a medical treatise. The system saves the word and its parts-of-speech in a database (160) if it is a possible real word. The possible real word can be stored in a new word database (160), on the on-line dictionary (140), or in any other type of known storage location.

The new word database can later be used by other computer applications (200) to process documents or speeches (220). These applications are well known and include parsers, machine translation systems, and speech recognition systems. The database can also be used by lexicographers (300) to publish and/or revise dictionaries (320) for human beings.

Figure 2:
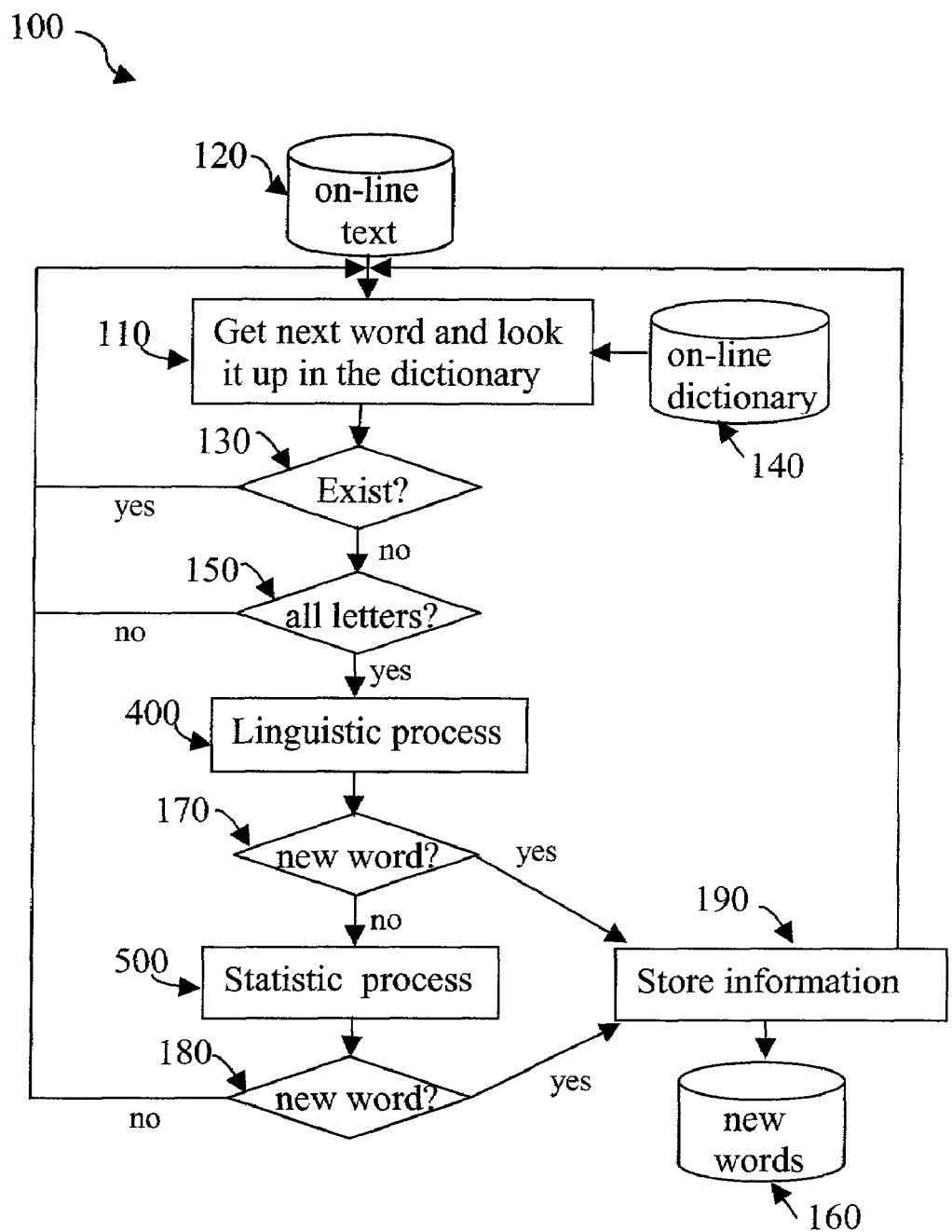
FIG. 2 is a flow chart of the overall dictionary augmentation process.

FIG. 2 shows a flow chart of the overall dictionary augmentation process (100). When a document (120) is read in the system, e.g., using standard techniques, the system gets a word from the document and looks up the word (110) in the system dictionary (140). If the word exists in the dictionary (130), no further processing is needed. However, if the word does not exist in the dictionary, the system checks if the word consists only of letters (150). If the word contains one or more digits or special characters, the system ignores the words.

If the word consists only of letters, the system first applies the linguistic process (400) to examine if the word is a new derived word (i.e., morphological variations of existing words and/or compounding words). If this process succeeds (170), then the system optionally saves the word and its lexical information (190) into the new word database (160) or other storage location. If it fails, in a preferred embodiment, the system applies the statistic process (500). If the process (500) recognizes the word as a new word (180), it saves the word and its lexical information (190) into the new word database (160). The processing is repeated until there are no more words left in the document.

Figure 3:
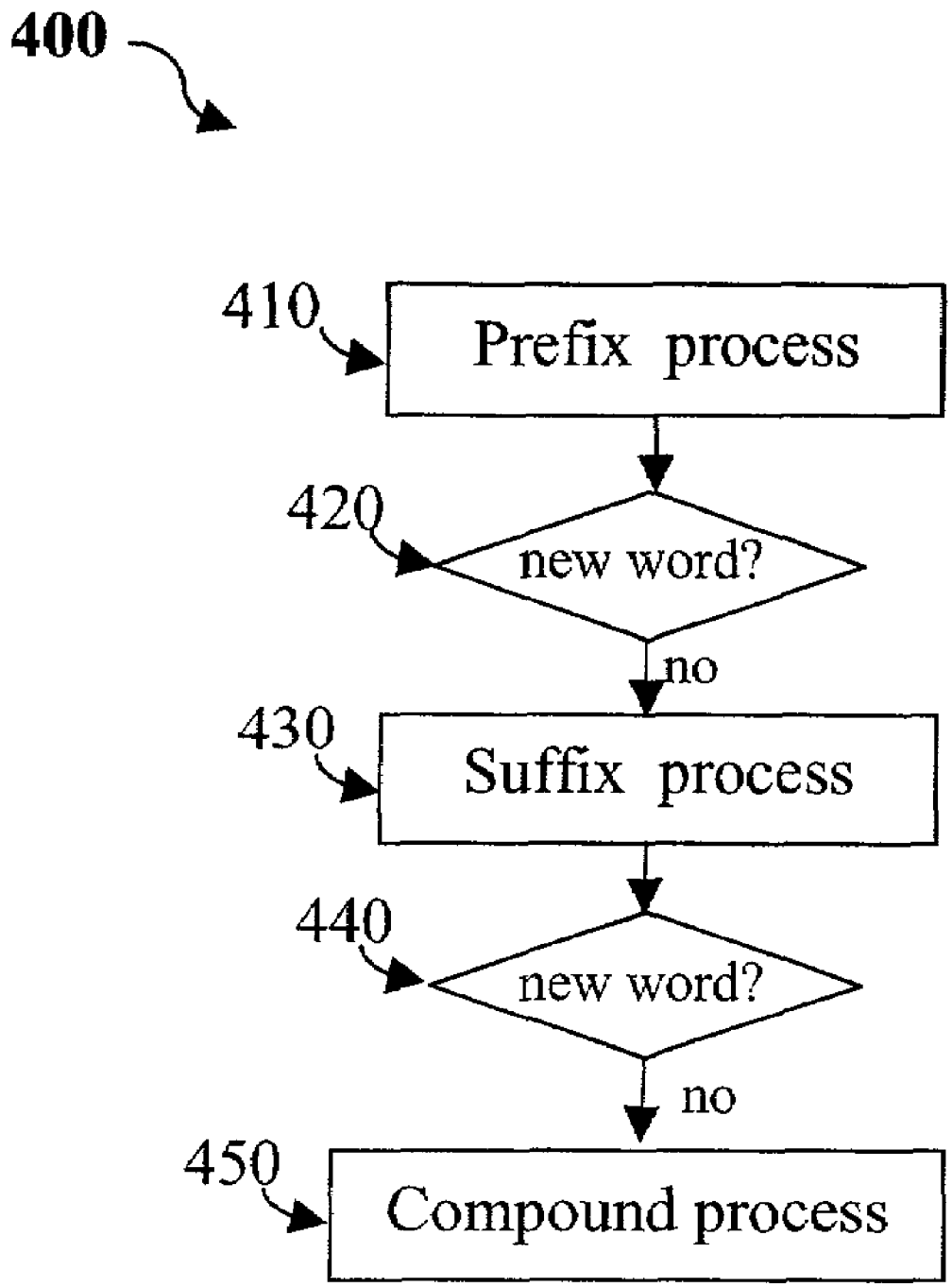
FIG. 3 is a flow chart of a linguistic process including a prefix process, a suffix process, and a compound process.

FIG. 3 shows a flow chart of the overall linguistic process (400). This process is for recognizing newly derived words. Derived words are morphological variations of words already known to the lexicon, mostly by means of affixation, i.e., adding prefixes to the beginning of words or suffixes to the end, and/or by means of compounding, i.e., two or more words are written as one word. First, the system examines if the word comprises of one or more prefixes and a root word (410). If the prefix process (410) succeeds (420), the word is regarded as a new word, and the process stops. If the prefix process fails (420), the system examines if the word comprises one or more suffixes and a root word (430). If the suffix process succeeds, the word is regarded as a new word, and the process stops (440). If the suffix process (440) fails (440), the system runs the compound process (450) to see if the word comprises two content words. If the compound process succeeds, the word is regarded as a new word, and the process stops. Note that the invention may work with one or more of the prefix process (410), suffix process (430), and/or compound process (450) functioning alone or in combination with one or more of the other processes.

Figure 4:
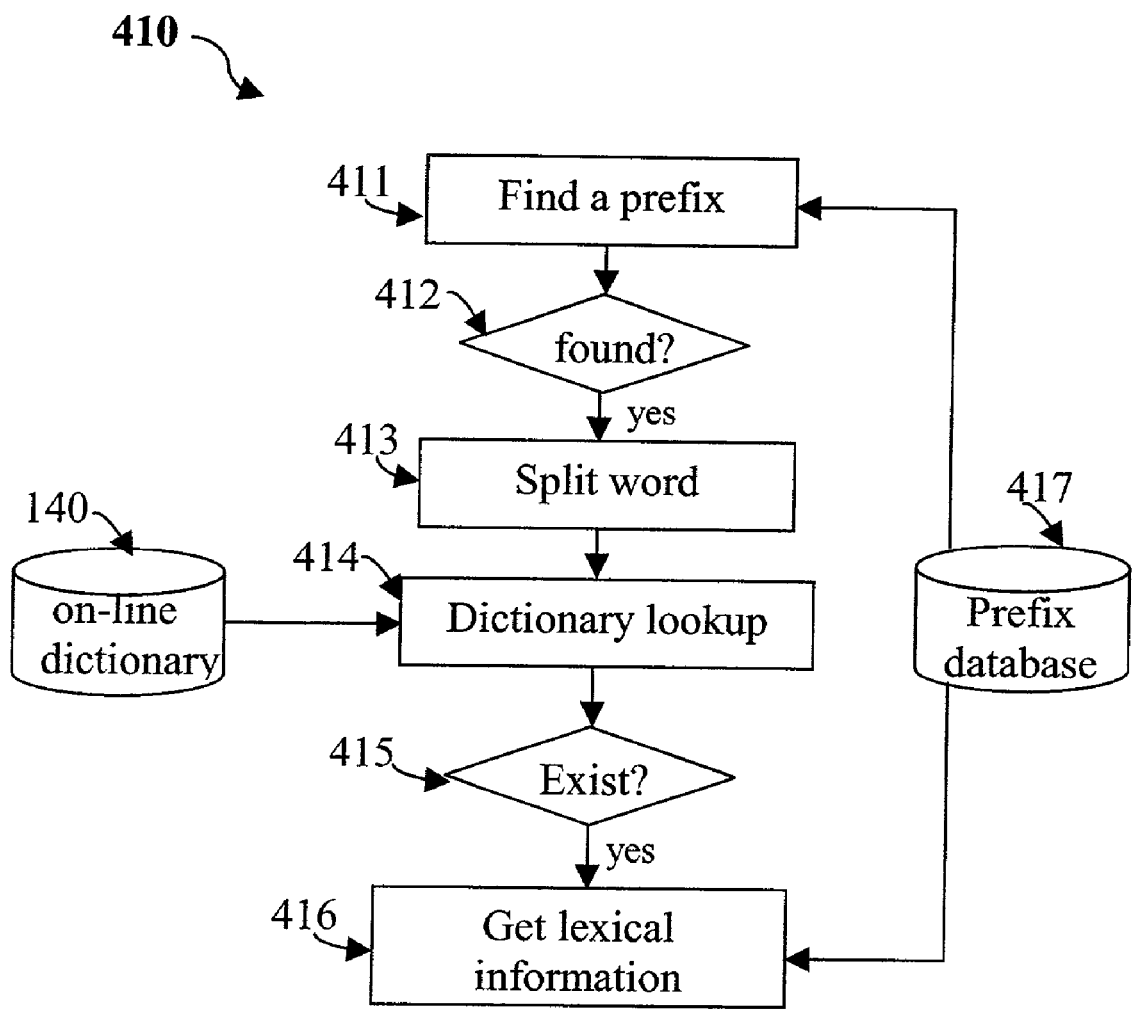
FIG. 4 is a flow chart of the prefix process used in the linguistic process.

FIG. 4 shows a flow chart of the prefix process (410) used in the linguistic process (400). The process (410) for prefixed words is as follows.

First, the system checks if any of the prefixes in a prefix list (417) appear at the beginning of the word (411). If a word contains a prefix (412), then the system chops the prefix off the word (413) (splits the word) and looks up the remaining part (the root word) in the dictionary (414). In one preferred embodiment, the invention, sets the minimum length of a root word to two characters. If the dictionary contains the root word (415), the out-of-vocabulary word is regard as a real word and the word being processed by process 410 inherits the lexical information of the root word (416). For example, antiasthmatic (adverb), autoinjector (noun), remanufactured (past tense of verb), streoselectivity (noun) are discovered by the prefix process (410).

Figure 5:
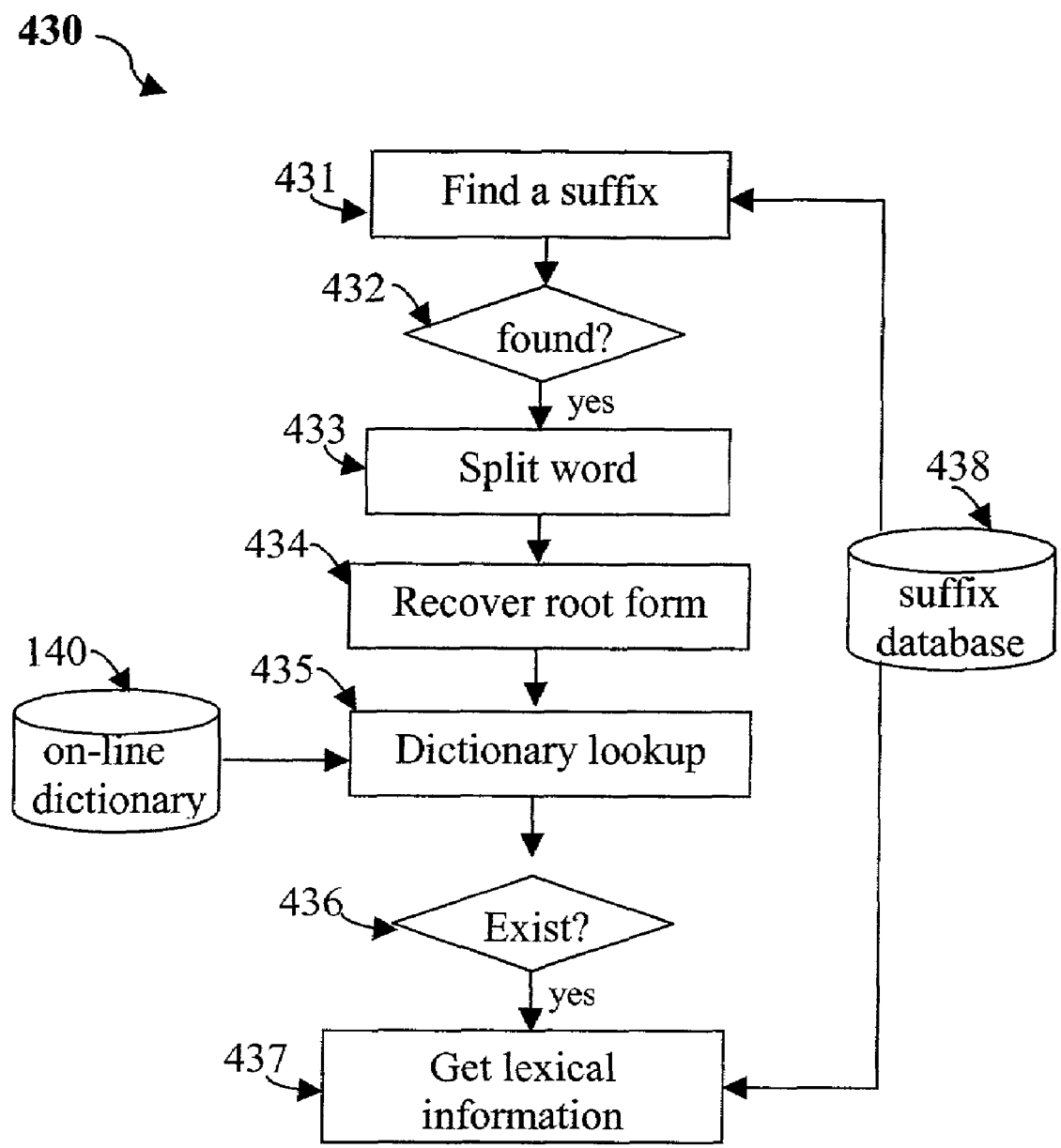
FIG. 5 is a flow chart of the suffix process used in the linguistic process.

FIG. 5 shows a flow chart of the suffix process (430) used in the linguistic process (400). The processing for suffixes is as follows: First, the system checks if any of the suffixes in a suffix database (438) appear at the end of the word (431). In a preferred embodiment, the invention applies a rule set for suffixes (438), which describes the pre-conditional POS (part of speech) of a root word for having a specific suffix and the resulting POS.

A non limiting example of the suffix rule structure used in a preferred embodiment is as follows. The rule for suffix able is [able, {VB=>JJ}, {NN=>JJ}]. This means, a verb (VB) or a noun (NN) may have suffix able at the end of the word, and the resulting word's part-of-speech is an adjective (JJ). If a word contains a suffix (432), the system removes the suffix (433) and looks up the root word in the dictionary (435). If the root word is found in the dictionary (436) and it has one of the pre-conditional POS, then the word is regarded as a real word and it has the result POS of the rule (437).

However, if the root word does not exist in the dictionary, the system performs a root form recovery (434). When a suffix is added to a word, the root word's spelling may change. For instance, in English, words ending with a silent e usually drop the e before a suffix beginning with a vowel. For example, when the system reads in browsable, it separates the suffix able, and obtains the root word brows. The system looks up brows in the dictionary, but fails. Then, the system performs the root form recovery process and obtains the original form browse.

For the root form recovery, in a preferred embodiment, the invention employs the following rules.

(1) if the two last letters of the root word are a same consonant, then delete one.
(2) if the last letter of the root word is 'i', then change it to 'y'
(3) if the last letter of the root word is a consonant (but not the first case), then add a 'e'

If the recovered root word is found in the dictionary (436) and it has one of the pre conditional POS, then the word is regarded as a real word and it has the result POS of the rule (437). Some examples of this case are browsable (adjective), migranious (adjective), and oxidizability (noun).

Some words, for example, remanufacturability, comprises one or more prefixes, and one or more suffixes, and a root word. In this case, the word goes through the prefix and suffix processes explained above.

Figure 6:
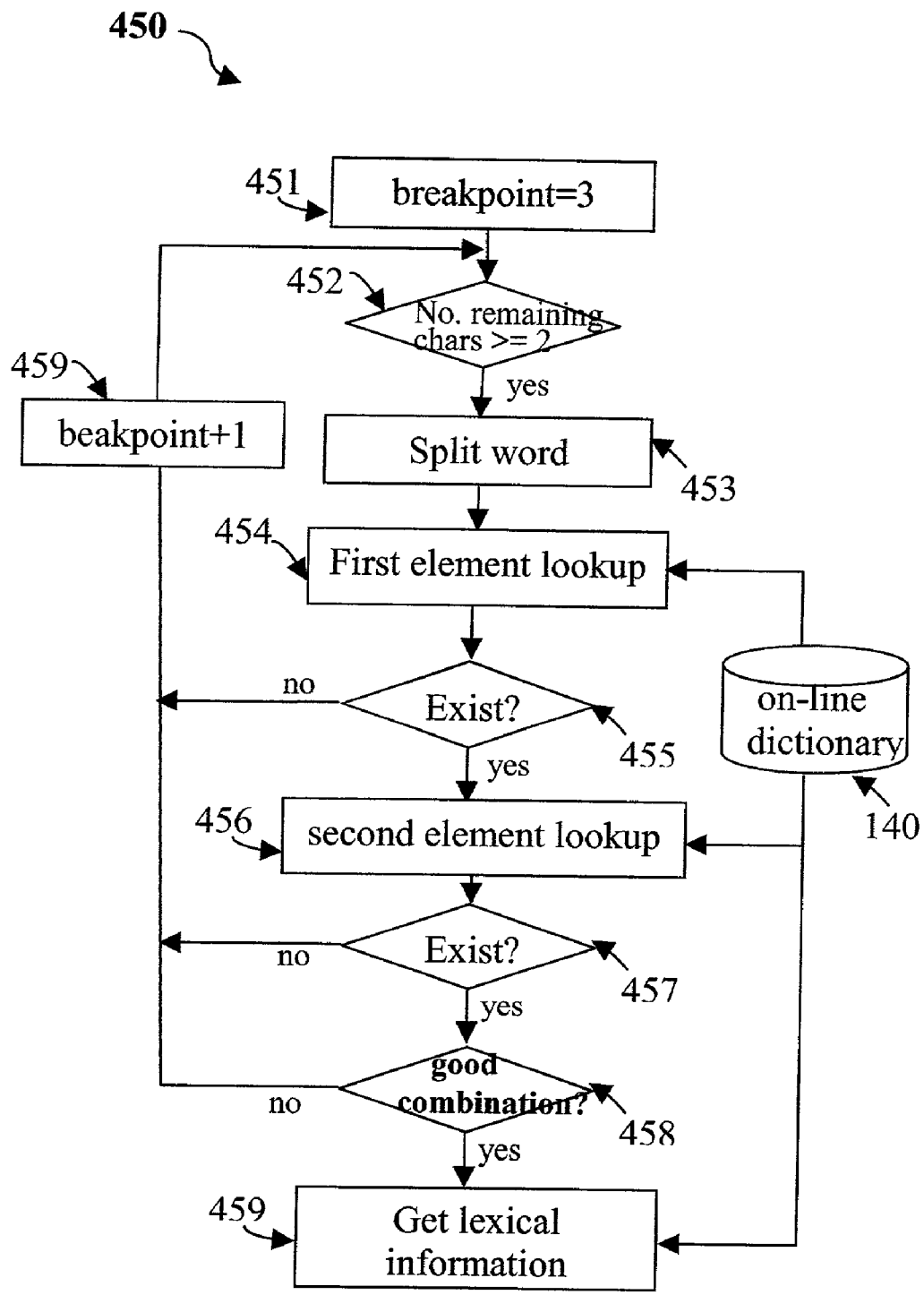
FIG. 6 is a flow chart of the compound process used in the linguistic process.

FIG. 6 shows a flow chart of the compound process used in the linguistic process. If a word fails both the prefix processing and the suffix processing, it is considered for the compound processing (450). The system breaks a given out-of-vocabulary word into two components (453)—the first component comprising letters from the first to the breakpoint, the second component comprising letters from the breakpoint+1 to the end of the word. The initial breakpoint is 3 (451). Then the system looks up the first element in the dictionary (454). If the first element is not found in the dictionary (455), the system increases the breakpoint (459), and repeats the process until the number of letters in the second element is 2 or less (452).

If the first element is known to the dictionary (455), it looks up the second element in the dictionary (456). If the second element also is found in the dictionary (457), the system examines if the combination of the two elements is valid (458). Possible combinations of words are Noun+Noun and Noun+Participle form of verbs. If the combination is valid, the out-of-vocabulary word is considered as a real word and has the second component's part-of-speech (459). Some examples of the compound words are airbreathing (noun, gerund), eyedrops (noun), photophobia (noun), and website (noun).

Figure 7:
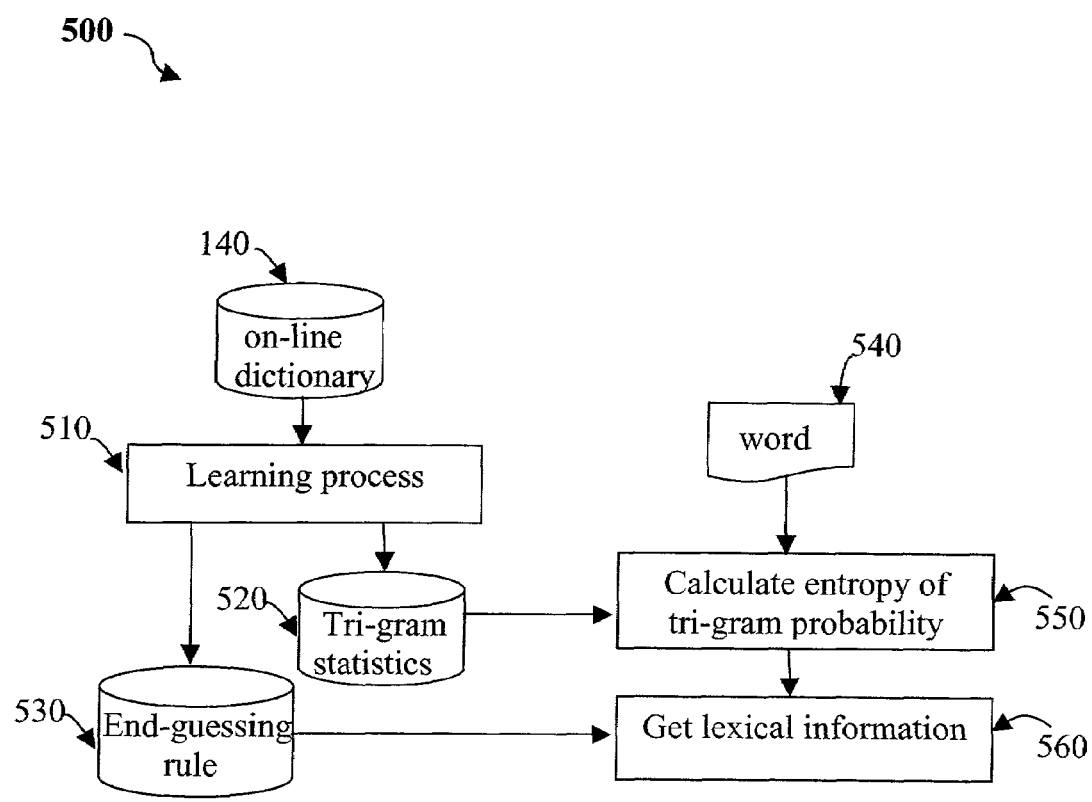
FIG. 7 is a flow chart of a statistical process.

FIG. 7 shows a flow chart of a preferred, overall statistic process (500). This process is for recognizing non-derivational new words. Non-derivational new words mean the words that can not be produced by the derivation (or word formation) rules from the existing words of the language. Many domain-specific technical terms belong to this category. Human beings can very successfully guess whether a word never seen before is a possible real word or not, even though the word is not comprised of already known words. In one embodiment, we assume that human beings may conclude that a word is a possible word of the language, if the character sequences in the word look probable, and it is natural to pronounce. We base the recognition of non-derivational new words on this assumption.

In this invention, we regard a sequence of letters as a possible real word if every character in the string is likely to co-occur with its neighbors. (The sequence of letters/characters combined with the neighbors is called a string.) The neighbors could be any number of preceding or following characters. This method is based on the predictability of a language; how well can be the next letter of a text be predicted when the preceding or following n letters are known. In a preferred embodiment, we define the neighbors of a character as the two preceding characters. That is, if the characters in a word have high chances to occur in their position given the two preceding characters have been seen (i.e., a trigram model, here the string is three characters or a trigram), the word is regarded as a real word.

This model has two modes—a learning mode (510) and an application mode (550, 560). In the learning mode, the system learns the probability of character trigram statistics from the system dictionary (140) and saves the trigram statistics in a database (520). The learning mode also generates part-of-speech guessing rules based on word endings (530) from the training data. In the application mode, when the system gets an out-of-vocabulary word (540), the system calculates the entropy of probabilities of all character trigrams in the word (550).

The entropy of a language model is the expected value of the information. The entropy is a measure of the model's uncertainty about the future; it increases as the estimated probability distribution approaches the uniform. This invention proposes a model which, when presented with an out-of-vocabulary word (one or more sequences of letters or word sequence), is able to make a decision if the word sequence would be a possible real word of the language based on its statistical structure. That is, a word is a cohesive group of letters with strong internal statistical influences.

Suppose a word w consists of n characters, i.e., $w = c_1 \ldots c_n$. We add one leading space and one trailing space to estimate trigram probabilities (explained in more detail in the description for FIG. 8), making $w = c_0 c_1 \ldots c_n c_{n+1}$. The entropy of a word w, H(w), is calculated as follows.

$$H(w) = -\sum_{i=2}^{n+1} P(c_i \mid c_{i-1}, c_{i-2}) \log_2 P(c_i \mid c_{i-1}, c_{i-2})$$

In a preferred embodiment, if the entropy value is high (greater than a given threshold value), the invention concludes the word is a real word. In one embodiment, the threshold is set to 2.3, which was determined from the average entropy minus the minimum entropy of the training data (see, the description for FIG. 8 for the training data). If a word is decided as a real word, the system generates all the possible parts-of-speech from the end-guessing rule base (560). End-guessing rules are explained in the description for FIG. 8. By using the end-guessing rule set, the system produces all possible parts-of-speech of a word on the basis of the longest matching pattern. The invention, looks up the ending letters of the word in the rule set from the longest ending (5 letters if the word's length is larger than 7, otherwise the word's length minus 3) to the ending of length 1 (the final letter). If an ending exists in the rule set, the matching process stops, and the system produces all the parts-of-speech of the ending in the order of the rule frequencies. For instance, cortical is guessed as an adjective and a noun, but adjective reading is preferred because tical appears 105 times as an adjective and 4 times as a noun in the training data. Some examples of new words recognized by the statistic process are accelerometers (noun), diastolic (adjective, noun), kinesiology (noun) and ingressed (past tense verb).

Figure 8:
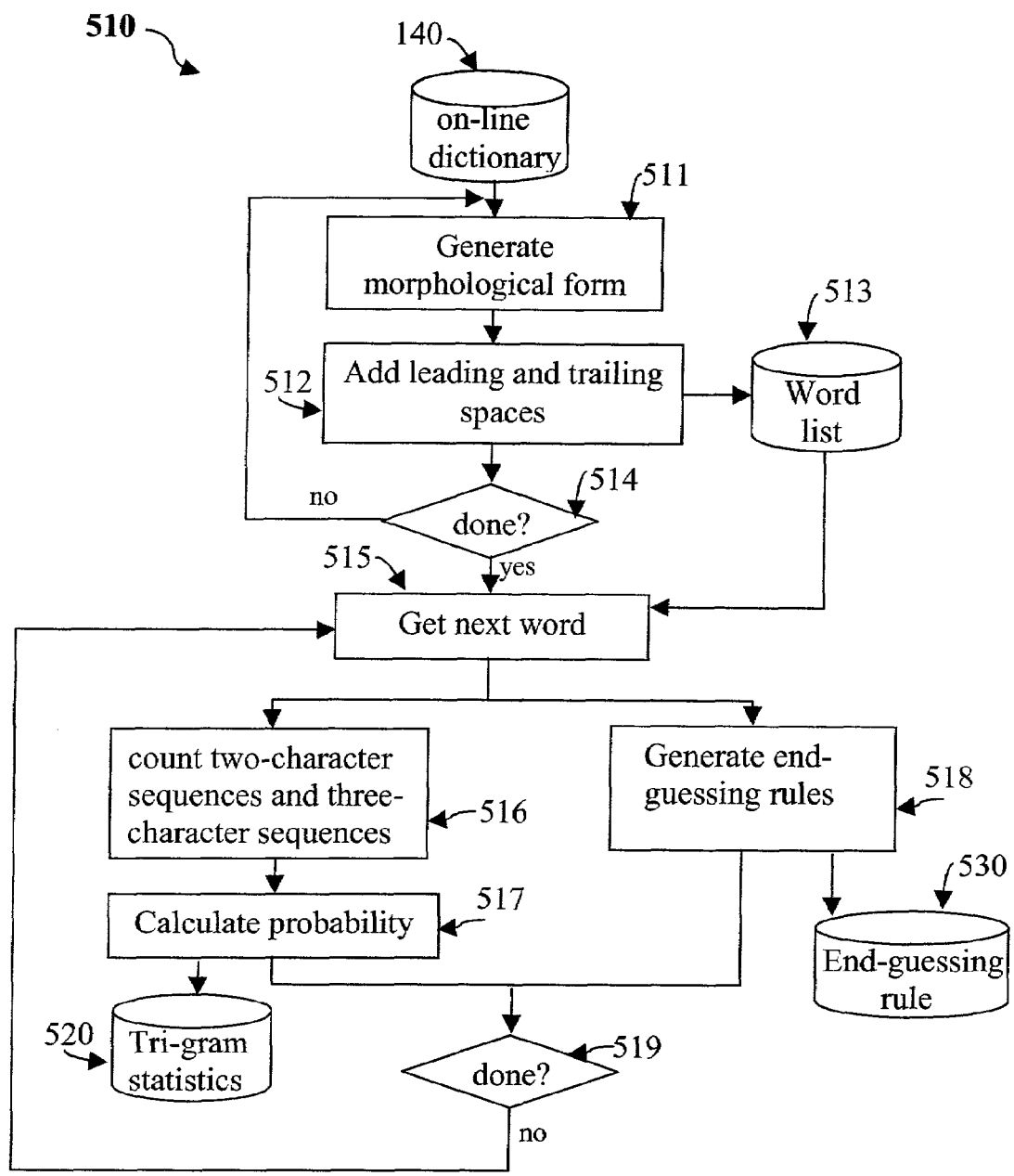
FIG. 8 is a flow chart of a statistical learning process.

FIG. 8 is a flow chart of a statistical learning process (510). In order to learn the trigram probabilities of words, the system uses the system dictionary (140), in which words are all valid words of the language. It reads in a word from the dictionary and generates all the possible inflectional variants of the word (511). It adds a leading space and a trailing space to the generated words (512) and saves the words in a database (513). For example, suppose a word, w, consisting of n letters, $c_1 c_2 c_3 \ldots c_n$, is an out-of-vocabulary word. The system adds a leading space ($b_1$) and a trailing space ($b_2$) to the word (512), resulting $w' = b_1 c_1 c_2 \ldots c_c b_2$. This word list contains all the valid word forms, which can be generated from a dictionary. It repeats this process until all the words in the dictionary are processed (514). With the generated word list, the system learns two pieces of knowledge—trigram statistics and part-of-speech rule. The learning process continues until all the words in the word list are processed (519).

The system calculates the probability of trigrams from the word list (513) by counting the frequencies of three letter sequences and two letter sequences. The system reads in a word (515) from the word list (513), and generates all possible three letter sequences and two letter sequences, and increases their frequencies (516).

For example, let a word, $w = b_1 c_1 c_2 \ldots c_n b_2$, consist n letters and two spaces—one leading space and one trailing space. Then, the system generates all the possible all the possible two letter sequences such as $b_1 c_2, c_1 c_2, \ldots, c_{n-1} c_n, c_n b_2$, and all the possible three letter sequences such as $b_1 c_1 c_2, c_1 c_2 c_3, \ldots, c_{n-1} c_n b_2$. The system counts the frequencies of all the two letter and three letter sequences found from words in the word list.

Having obtained the frequencies of three letter sequences and two letter sequences, the system computes all the possible trigram probability (517) and saves the statistics in a database (520). The probability of a trigram, i.e., the probability of the occurrence of a letter, $c_3$, given the two characters preceding it, $c_1$ and $C_2$, is calculated as follows.

$$P(c_3 \mid c_1 c_2) = \text{frequency}(c_1 c_2 c_3) / \text{frequency}(c_1 c_2)$$

In addition, it also generates part-of-speech guessing rules from the word list (518). For all the words in the word list, we generate all possible endings from length 1 up to length 5, together with the parts-of-speech of the words. We set the minimum length of the remaining part to 3. The system counts the frequencies of end guessing rules and saves the rules in the end-guessing rulebase (530).

For example, the word 'ailments' is listed as a plural noun (NNS) in the training dictionary. Then the end guessing rule generator produces all the endings from length 1 (s) up to length 5 (ments) with its part-of-speech. That is, it generates the rules, s-NNS, ts-NNS . . . , and ments-NNS. The word 'mounting' has two parts-of-speech, noun(NN) and gerund (VBG). In this case, each ending has two parts-of-speech. That is, g-NN and g-VBG, ng-NN and ng-VBG . . . , and nting-NN and nting-VBG. The following table shows how end-guessing rules are generated from our training data.

| word | ailments | mounting | | abandons | primary | |
|---|---|---|---|---|---|---|
| End-Guessing Rules | ments NNS | nting NN | nting VBG | ndons VBZ | mary NN | mary JJ |
| | ents NNS | ting NN | ting VBG | dons VBZ | ary NN | ary JJ |
| | nts NNS | ing NN | ing VBG | ons VBZ | ry NN | ry JJ |
| | ts NNS | ng NN | ng VBG | ns VBZ | y NN | y JJ |
| | s NNS | g NN | g VBG | s VBZ | | |

NN: noun
NNS: plural form of nouns
JJ: adjective
VBG: gerund or present participle of verbs
VBZ: third person singular form of verbs FIG. 9 is an example output of words identified by the present invention as words in a natural language. The method column in the figure specifies the mechanism used to recognize the sample new words. The words in the Prefix method are recognized by the process 410, and the words in the Suffix method are recognized by the process 430. The words in the method Prefix+Suffix are recognized by the process 410 and the process 430, and the words in the method Compound are identified by the process 450. Finally the words in the method Entropy Statistics are identified by the process 500. That is, the entropy values of the words are greater than the given threshold.

Non limiting examples of this invention are used for identifying probable real words among out-of-vocabulary words in text. Using the techniques disclosed above, the identification of real words is done based on entropy of probability of character trigrams as well as the morphological rules of English. The invention also can generate possible parts-of-speech (POS) of the identified real words on the basis of lexical formation rules and word endings. Embodiments of this invention have shown high performance both in precision and in recall. In alternative non limiting embodiments, the invention is very useful in recognizing domain-specific technical terms, and has successfully been embedded in a glossary extraction system, which identifies single or multi word glossary items and builds a domain-specific dictionary. Alternative embodiments will become evident to those skilled in the art given this disclosure. These embodiments are also within the contemplation of the inventor.

I claim:

1. A computer-implemented system for recognizing one or more words not listed in a dictionary database, the system comprising:
    at least one central processing unit;
    a memory operably associated with the at least one processing unit; and
    a dictionary augmentation system storable in memory and executable by the at least one processing unit, the dictionary augmentation system comprising:
        a root process that searches the dictionary database to obtain root information about a root word, the root word being a word with no prefix and suffix; and
        a statistical process that, if the root word is not found in the dictionary database, checks one or more proper substrings of the root word comprising two or more characters in the root word and every proper substring having fewer characters than the root word, against a complete database of each and every possible subset of individual valid words within the dictionary database, to determine, from the likelihood that the proper substring of the root word occurs in a sequence in the subsets of the individual valid words, a probability that the root word is a valid word that was previously unknown, wherein each character in the root word and in the individual valid words is an alphabet-based character and wherein the dictionary database is distinct from the complete database.

2. A system, as in claim 1, where the probability comprises a measure of a likelihood that a substring of the one or more substrings is correctly placed adjacent to one or more other characters in the root word.

3. A system, as in claim 2, where the one or more other characters precedes the substring.

4. A system, as in claim 2, where the one or more other characters follows the substring.

5. A system, as in claim 4, where the substring and one or more other characters form a trigram.

6. A system, as in claim 2, where the probability is determined by:
    comparing, for each of the one or more substrings and the one or more adjacent characters in the root word, a string of the substring and the adjacent character to a database of strings associated with a respective probability to yield a set of string probabilities;
    multiplying each string probability in the set of string probabilities by a $\log_2$ of the string probability to yield a set of log string probabilities; and
    summing the log string probabilities in the set of log string probabilities to yield the probability that the root word is a valid word.

7. A system, as in claim 6, where the respective probability of the strings in the database is determined by finding one or more possible strings of characters and counting the frequency of occurrence of the possible strings of characters in a database of valid words.

8. A system, as in claim 2, further comprising one or more rules that define a part of speech of the word, the rules having a rule probability based on the frequency of occurrence, greater than a threshold, that the rule correctly applies to a database of valid words.

9. A system, as in claim 8, where the part of speech of the root word is determined by one of the rules.

10. A system, as in claim 8, where the rules apply to the ending of the root words.

11. A system, as in claim 1, further comprising:
    a compound word process that breaks the word into two components, the root word being the second component.

12. A system, as in claim 10, where the compound word process further determines a part of speech of the root word.

13. A system, as in claim 1, where once the word is determined to be a valid word, the word is stored in a new word dictionary memory.

14. A system, as in claim 1, further comprising a word counting process that counts the frequency of occurrence of the word in one or more documents to determine an importance of the word if the word is determined as the valid word.

15. A system, as in claim 1, further comprising:
    a prefix removal process that removes one or more prefixes from the word, the prefixes being in a prefix list, the prefix removal being constrained by one or more prefix removal rules, the prefix removal process further obtaining prefix information about the removed prefix.

16. A system, as in claim 15, where the prefix information is obtained from any one or more of the following: a dictionary database and a prefix list.

17. A system, as in claim 1, further comprising:
    a suffix removal process that removes one or more suffixes from the word, the suffixes being in a suffix list, the suffix removal being constrained by one or more suffix removal rules, the suffix removal process further obtaining suffix information about the removed suffix.

18. A system, as in claim 17, where the suffix information is obtained from any one or more of the following: a dictionary database and a suffix list.

19. A computer-implemented method for recognizing one or more words not listed in a dictionary database, the method comprising the steps of:
    identifying a root word in a document, wherein the document is stored on one of a hard disk and a network, and wherein the root word is a word with no prefix and no suffix;
    using at least one processing unit, searching the dictionary database to obtain root information about the root word; and if the root word is not found in the dictionary database, checking one or more proper substrings of the root word comprising two or more characters in the root word, and every proper substring having fewer characters than the root word, against a complete database of each and every possible subset of individual valid words within the dictionary database, to determine, from the likelihood that the substrings of the root word occurs in a sequence in the subsets of the individual valid words, a probability that the root word is a valid word that was previously unknown, wherein each character in the root word and in the individual valid words is an alphabet-based character and wherein the dictionary database is distinct from the complete database.

20. A computer-implemented system for recognizing one or more words not listed in a dictionary database, the system comprising:
- at least one central processing unit;
- a memory operably associated with the at least one processing unit; and
- a dictionary augmentation system storable in memory and executable by the at least one processing unit, the dictionary augmentation system comprising:
- means for searching the dictionary database to obtain root information about a root word, the root word being a word with no prefix and suffix; and
- means for checking one or more proper substrings of the root word comprising two or more characters in the root word, and every proper substring having fewer characters than the root word, against a complete database of each and every possible subset of individual valid words within the dictionary database, to determine, from the likelihood that the substrings of the root word occurs in a sequence in the subsets of the individual valid words, a probability that the root word is a valid word that was previously unknown, if the root word is not found in the dictionary database, wherein each character in the root word and in the individual valid words is an alphabet-based character and wherein the dictionary database is distinct from the complete database.

21. A computer memory storage device storing a dictionary augmentation System, the dictionary augmentation system comprising a computer program that causes a computer system to perform the steps of:
- identifying a root word in a document, wherein the document is stored on one of a hard disk and a network, and wherein the root word is a word with no prefix and no suffix;
- using at least one processing unit, searching the dictionary database to obtain root information about the root word; and
- checking one or more proper substrings of the root word comprising two or more characters in the root word, and every proper substring having fewer characters than the root word, against a complete database of each and every possible subset comprising individual valid words within the dictionary database, to determine, from the likelihood that the subsets of the root word occurs in a sequence in the subsets of the individual valid words, a probability that the root word is a valid word that was previously unknown, if the root word is not found in the dictionary database, wherein each character in the root word and in the individual valid words is an alphabet-based character and wherein the dictionary database is distinct from the complete database.

* * * * *